United States Patent [19]
Hartsfield et al.

[11] Patent Number: 4,779,730
[45] Date of Patent: Oct. 25, 1988

[54] MEDIA BOX STORAGE CONTAINER

[76] Inventors: John W. Hartsfield, 9510 - 167th Ave. SE., Snohomish, Wash. 98290; Roger V. Meuter, 1032 - 34th Ave. E., Seattle, Wash. 98112; John G. Tanner, 1518 SW. Webster, Seattle, Wash. 98106

[21] Appl. No.: 141,293

[22] Filed: Jan. 5, 1988

[51] Int. Cl.⁴ .......................... B65D 1/24; B65D 1/36
[52] U.S. Cl. ...................... 206/387; 220/22; 206/561
[58] Field of Search ............ 206/387, 561, 444; 220/22

[56] References Cited
U.S. PATENT DOCUMENTS

| | | | |
|---|---|---|---|
| 3,635,350 | 1/1972 | Wolf | 206/387 X |
| 3,756,383 | 9/1973 | Kryter | 206/1 R |
| 3,856,369 | 12/1974 | Commiant | 206/387 X |
| 4,366,903 | 1/1983 | Gaiser et al. | 206/387 |
| 4,369,883 | 1/1983 | Stravitz | 206/387 |
| 4,432,453 | 2/1984 | Berkman | 206/387 |
| 4,440,299 | 4/1984 | Peinecke | 206/387 |
| 4,577,914 | 3/1986 | Stravitz | 312/10 |
| 4,592,468 | 6/1986 | Wallace | 206/387 |
| 4,595,098 | 6/1986 | Kryter | 220/22 X |
| 4,629,066 | 12/1986 | Howard | 206/387 |
| 4,705,169 | 11/1987 | Mastronardo | 220/22 X |
| 4,712,679 | 12/1987 | Lowe | 206/387 |

Primary Examiner—William Price
Attorney, Agent, or Firm—Christensen, O'Connor, Johnson & Kindness

[57] ABSTRACT

A storage container (11) for storing media (magnetic tape cassette, compact disc, digital audio tape, etc.) boxes, formed of soft, pliable plastic is disclosed. The storage container (11) is open-topped and includes a plurality of parallel cross-ribs (23), integrally formed with the bottom (21) and the side walls (13 and 15) of the container (11). The cross-ribs (23), in combination with the bottom (21) and walls (13, 15, 17 and 19) of the storage container define chambers (25) for receiving media boxes (35) to be stored in the container (11). Located at either end of the box chambers (25) are integral protrusions (37) that frictionally engage the ends of the media boxes (35) stored in the container (11).

13 Claims, 2 Drawing Sheets

MEDIA BOX STORAGE CONTAINER

TECHNICAL AREA

This invention relates to storage containers and, more particularly, containers for storing media boxes.

BACKGROUND OF THE INVENTION

A wide variety of containers for storing media (magnetic tape cassette, compact disc, digital audio tape, etc.) boxes have been proposed and are in use. The vast majority of such media box containers are formed of brittle plastics, such as polystyrene. While relatively inexpensive, containers formed of brittle plastics are easily broken when dropped on a hard surface or in some other manner subjected to a high impact force.

In addition to being brittle, the vast majority of previously developed containers for storing media boxes loosely hold the media boxes to be stored. In order to prevent media boxes from falling out of such containers should the containers be inadvertently oriented such that gravity could cause the media boxes to fall out of the container, i.e., inverted, many prior art containers for storing media boxes include covers. U.S. Pat. No. 4,366,903 entitled "Magazine For Magnetic Tape Cassettes" describes a trough-shaped cassette storage container that overcomes the gripping problem by providing strips of resilient materials adhesively attached to the inner walls of the trough. Rather than being formed of polystyrene, the trough is formed of polyvinyl chloride, that allows the side walls of the trough to be resiliently forced apart when a magnetic tape cassette is to be inserted or removed. Among other disadvantages, the cassette storage container described U.S. Pat. No. 4,366,903 is more expensive than desirable due to the material and labor costs involved in attaching strips of resilient material to the inner surface of trough side walls.

The present invention is directed to providing a media box storage container that overcomes the foregoing disadvantages of previously-developed media and media box storage containers.

SUMMARY OF THE INVENTION

In accordance with this invention, a storage container for storing media (magnetic tape cassette, compact disc, digital audio tape, etc.) boxes is provided. The storage container is formed of soft, pliable plastic, preferably a polyvinyl chloride plastic. The storage container is open-topped and includes side walls and end walls. A plurality of parallel cross-ribs, integrally formed with the bottom and the side walls of the container extend from one side wall to the opposite side wall. The cross-ribs, in combination with the bottom and walls of the storage container, define chambers for receiving media boxes to be stored in the container. The cross-ribs also stiffen the side walls and limit the amount the side walls can flex outwardly. The storage container also includes an integral friction mechanism located at either end of each chamber for frictionally engaging the ends of media boxes located in the chambers.

In accordance with further aspects of this invention, the integral friction mechanism comprises integral protrusions formed in the side walls, at the ends of each chamber.

As will be readily appreciated from the foregoing description, a media box storage container formed in accordance with the invention overcomes the disadvantages of previously-developed containers for storing media and/or media boxes. Because a storage container formed in accordance with the invention is formed of a soft, pliable plastic, rather than a brittle plastic, it is not readily broken when dropped on a hard surface, or in some other manner subjected to an impact force adequate to destroy a prior art brittle container. Further, because the walls, bottom, ribs and friction mechanism, e.g., protrusions, are all integrally formed, a storage container formed in accordance with the invention is relatively inexpensive to manufacture, particularly when compared to a storage container formed of an assemblage of components, such as a storage container of the type described in U.S. Pat. No. 4,366,903.

BRIEF DESCRIPTION OF THE DRAWINGS

The foregoing objects and many of the attendant advantages of this invention will become more readily appreciated as the same becomes better understood from the following description of preferred embodiments of the invention when taken in conjunction with the accompanying drawings wherein.

DESCRIPTION OF THE PREFERRED EMBODIMENTS

Figure 1:
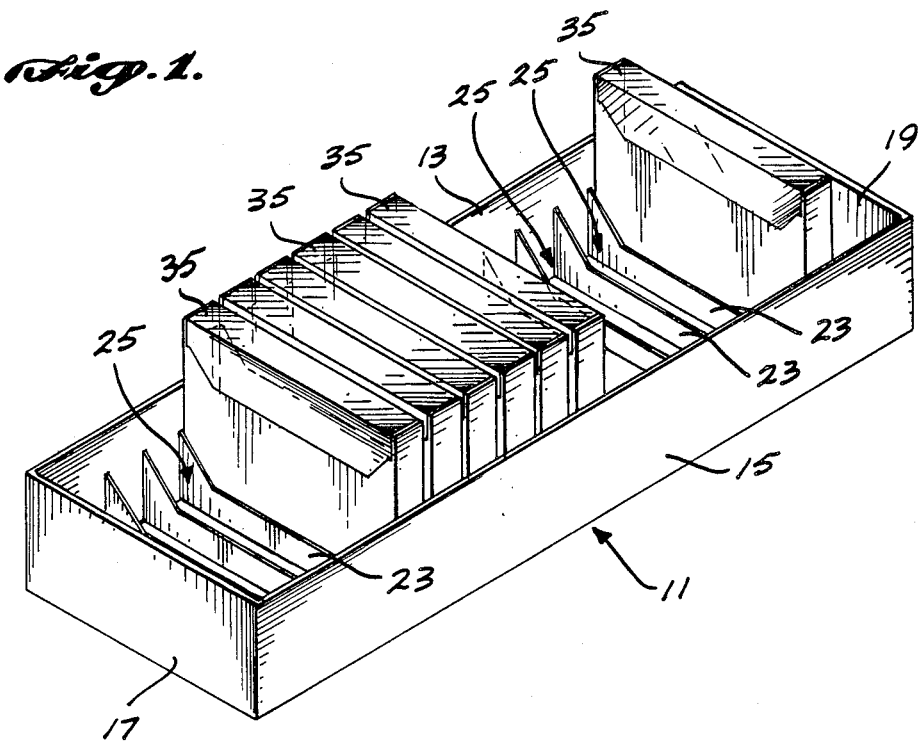
FIG. 1 is a pictorial view of a media box storage container formed in accordance with the invention suitable for storing magnetic tape cassette boxes.

As illustrated in FIG. 1, a media box storage container formed in accordance with the invention comprises an open-top box 11. The open-top box 11 is formed of a soft, pliable plastic material, such as polyvinyl chloride. The open-top box 11 comprises: a pair of side walls 13 and 15; a pair of end walls 17 and 19; and, a bottom 21, all integral with one another. The side walls 13 and 15, end walls 17 and 19, and bottom 21 define a right rectangular parallelepiped. Because the side walls 13 and 15, end walls 17 and 19 and bottom 21 are integrally formed, the box is a single unit.

Integrally formed with the side walls 13 and 15 and the bottom 21 are a plurality of cross-ribs 23. The cross-ribs span the distance between the side walls 13 and 15 and, as a result, in combination with the side walls 13 and 15 and the bottom 21, define chambers 25. The cross-ribs 23 are relatively thin and have a U-shaped planar configuration. More specifically, the ribs include a cross leg 31 and side legs 33 located at either end of the cross leg 31. The cross leg 31 is integral with the bottom 21 and the side legs 33 are integral with the sides 13 and 15. Further, the side legs 33 are triangularly shaped.

Figure 2:
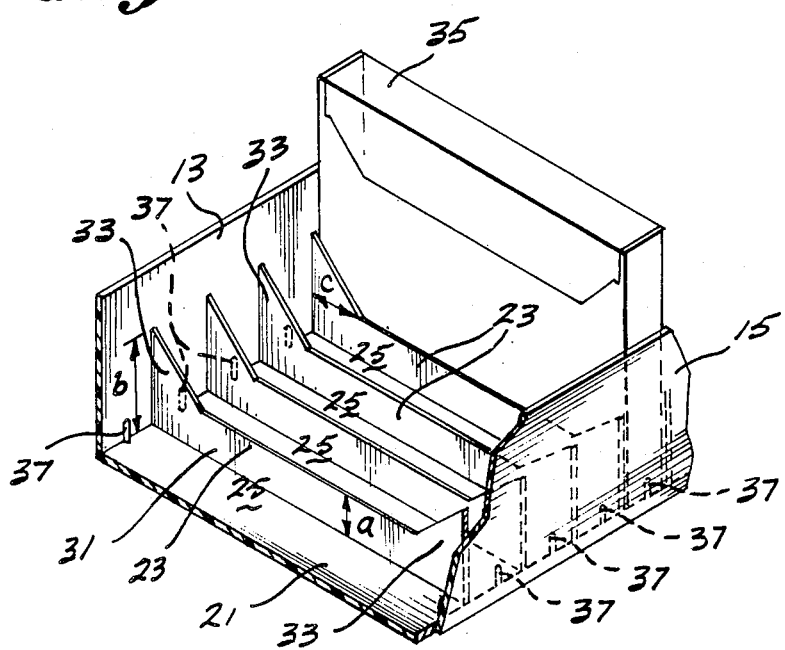
FIG. 2 is an enlarged view of a portion of the embodiment of the invention illustrated in FIG. 1.
Figure 3:
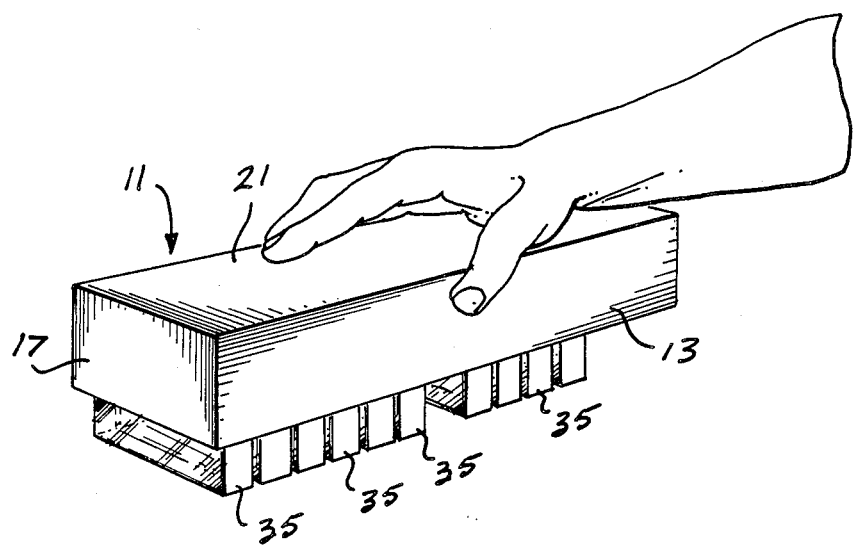
FIG. 3 is a pictorial view illustrating an embodiment of the invention of the type illustrated in FIGS. 1 and 2 held in an inverted position; and, FIG. 4 is a pictorial view of an embodiment of the invention suitable for storing compact disc boxes.

The distance between the side walls 13 and 15 is slightly greater than the length of a media box, which in the case of FIGS. 1-3 is a tape cassette case 35. Further, the distance between the cross-ribs 23 is slightly greater than the thickness or height of the media box, i.e., the tape cassette box 35. As a result, the tape cassette box 35 does not frictionally engage either the cross-ribs 33 or the side walls 13 and 15. While frictional engagement is not provided by the cross-ribs 23 or the side walls 13 and 15, media boxes, i.e., tape cassette boxes 35, are frictionally gripped when pushed suitably deep into the chambers 25 of the storage container 11. More specifically, located at either end of each chamber 25 is an integral protrusion 37 that extends inwardly from the related side wall 13 or 15. The distance between the protrusions lying at either end of the chambers is slightly less than the length of the media box, i.e, the tape cassette box 35. Consequently, when a tape cassette box is pushed downwardly into one of the chambers 25, the tape cassette box 35 is frictionally engaged by the protrusions 37. The frictional engagement is adequate to prevent fully inserted tape cassette boxes 35 from dropping out of the storage container 11 when the storage container is inverted, as illustrated in FIG. 1. Since tape cassette boxes are four and one-fourth (4¼) inches long, the spacing between the protrusions 37 is slightly less than four and one-fourth inches.

The outer distance between the side walls 13 and 15 of one actual tape cassette box storage container incorporating in the invention is four and one-hals inches. The side walls are 3/16 inch thick. The cross-rib 23 thickness is 3/32 inches and the height of the cross leg 31 from the bottom 21 (dimension A in FIG. 2) is one-half inch. The height of the side legs 33 along the side walls 13 and 15 (dimension B in FIG. 2) is one and three-eighths inches, and the points where the side legs 33 intersect the cross leg 31 (dimension C in FIG. 2) is one-half inch from the associated side wall. The protrusions 37 are ⅜ inch high and approximately 1/16 inch thick. The cross-ribs 23 are spaced-apart by ¾ inch. The side walls are three and 15/16 inches high and, while less relevant, the length of the storage container is 11 and ⅞ inches.

Figure 4:
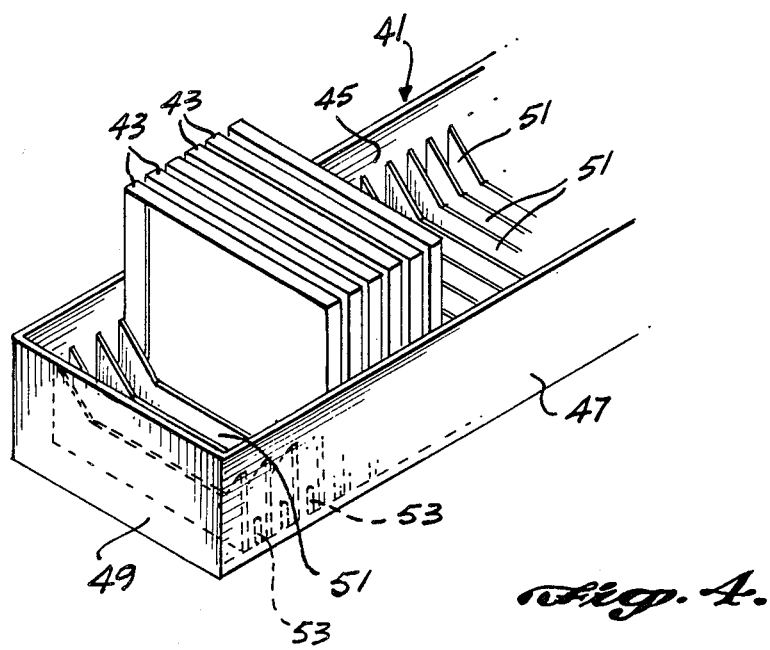

FIG. 4 illustrates a storage container 41 formed in accordance with the invention for housing compact disc boxes 43. Like the tape cassette box storage container illustrated in FIGS. 1–3, the compact disc box storage container 41 includes integral side walls 45 and 47, end walls 49 and a bottom. Cross-ribs 51 integrally formed with the bottom and side walls 45 and 47 extend between the side walls 45 and 47. The cross-ribs 51 in combination with the bottom and walls 45, 47 and 49 of the storage container 41 define chambers for receiving compact disc boxes 43. The distance between the side walls 45 and 47 is slightly greater than the width of the compact disc boxes 43 and the distance between the ribs 51 is slightly greater than the thickness of compact disc boxes 43. Like the tape cassette box storage container 11 illustrated in FIGS. 1–3, the compact disc storage container 41 illustrated in FIG. 4 includes integral protrusions 53 that extend inwardly from the side walls 45 and 47 of each of the chambers. The protrusions 53 are sized to frictionally engage the outer edges of the compact disc boxes 43. As will be readily appreciated by those skilled in the media box art, a standard musical compact disc box is 7/16 inches thick, and four and 15/16 inches high and five and ⅜ inches wide.

As will be readily appreciated from the foregoing description, the invention comprises a media box storage container that is highly break resistant due to its being formed of a soft, pliable plastic material, such as polyvinyl fluoride. Further, while a media box storage container formed in accordance with the invention frictionally engages media boxes to be stored, the containers are relatively inexpensive to manufacture and produce because the frictional engagement mechanism is integral with the container. That is, rather than being an assemblage of components, a media box storage container formed in accordance with the invention is unitarily formed. In addition to defining chambers, the ribs prevent the side walls from being bent outwardly by an amount adequate to defeat the friction-gripping feature provided by the protrusions. More specifically, if cross-ribs were not included, the side walls could be flexed outwardly enough to overcome the ability of the protrusions to frictionally engage a media box.

While preferred embodiments of the invention have been illustrated and described, it will be appreciated that changes can be made therein. For example, a media box storage container formed in accordance with the invention can be sized to store media boxes other than magnetic tape cassette and compact disc boxes. For example, a media box storage container can be sized to store digital audio tape boxes or any one of the wide variety of video cassette tape storage boxes, in particular 8 mm video cassette tape storage boxes. Consequently, within the scope of the appended claims, the invention can be practiced otherwise than as specifically described herein.

The embodiments of the invention in which an exclusive property or privilege is claimed are defined as follows:

1. A storage container for storing media (magnetic tape cassette, compact disk, digital audio tape and the like) boxes having length, width and thickness dimensions, said media box storage container comprising:
   an open-topped container formed of a soft pliable plastic, said open-topped container including a bottom, side walls and end walls all integral with one another;
   a plurality of parallel, spaced-apart cross-ribs extending between said side walls and integral with said bottom and side walls, said parallel, spaced-apart cross-ribs in combination with said walls defining a plurality of media box chambers; and
   a plurality of integral protrusions, one integral protrusion formed in the side walls of said container at each end of said chambers, the space between said cross-ribs being slightly greater than the thickness of the media boxes to be stored in said container, the space between the side walls of said container being slightly greater than thelength of the media boxes to be stored in said container and the distance between said protrusions, across said chambers, being slightly less than the length of the media boxes to be stored in said container.

2. A media box storage container as claimed in claim 1, wherein the height of the walls of said open-topped container is less than the width of the media boxes to be stored in said container, wherebymedia boxes stored in said container extend above the side walls of said open-topped container.

3. A media box storage container is claimed in claim 2, wherein said parallel, spaced-apart cross-ribs have a planar U-shape.

4. A media box storage container as claimed in claim 3, wherein the cross leg of said U-shaped cross-ribs is integral with the bottom of said open-topped container and the side legs of said U-shaped cross-ribs are integral with the side walls of said open-topped container.

5. A media box storage container as claimed in claim 4, wherein said side legs of said U-shaped cross-ribs have a triangular planar shape.

6. A media box storage container as claimed in claim 5, wherein said side legs of said U-shaped cross-ribs extend up the side walls of said container approximately two-thirds the height of said side walls.

7. A media box storage container as claimed in claim 6, wherein said integral protrusions extend up the side walls of said container from the bottom of said container for a distance less than one-fourth the height of the side walls of said container.

8. A media box storage container is claimed in claim 1, wherein said parallel, spaced-apart cross-ribs have a planar U-shape.

9. A media box storage container as claimed in claim 8, wherein the cross leg of said U-shaped cross-ribs is integral with the bottom of said open-topped container and the side legs of said U-shaped cross-ribs are integral with the side walls of said open-topped container.

10. A media box storage container as claimed in claim 9, wherein said side legs of said U-shaped cross-ribs have a triangular planar shape.

11. A media box storage container as claimed in claim 10, wherein said side legs of said U-shaped cross-ribs extend up the side walls of said container approximately two-thirds the height of said side walls.

12. A media box storage container as claimed in claim 11, wherein said integral protrusions extend up the side walls of said container from the bottom of said container for a distance less than one-fourth the height of the side walls of said container.

13. A media box storage container as claimed in claim 1, wherein said integral protrusions extend up the side walls of said container from the bottom of said container for a distance less than one-fourth the height of the side walls of said container.

* * * * *

UNITED STATES PATENT AND TRADEMARK OFFICE
CERTIFICATE OF CORRECTION

PATENT NO. : 4,779,730

DATED : October 25, 1988

INVENTOR(S) : J. Hartsfield et al.

It is certified that error appears in the above-identified patent and that said Letters Patent is hereby corrected as shown below:

```
Column 3, line 16:   "FIG. 1" should be --FIG. 3--
Column 4, line 46:   "thelength" should be --the length--
Column 4, line 55:   "wherebymedia" should be --whereby media--
```

Signed and Sealed this

Twelfth Day of September, 1989

Attest:

DONALD J. QUIGG

Attesting Officer

Commissioner of Patents and Trademarks